J. W. POTTER.
TIRE INFLATION VALVE.
APPLICATION FILED OCT. 31, 1917.
1,297,239
Patented Mar. 11, 1919.
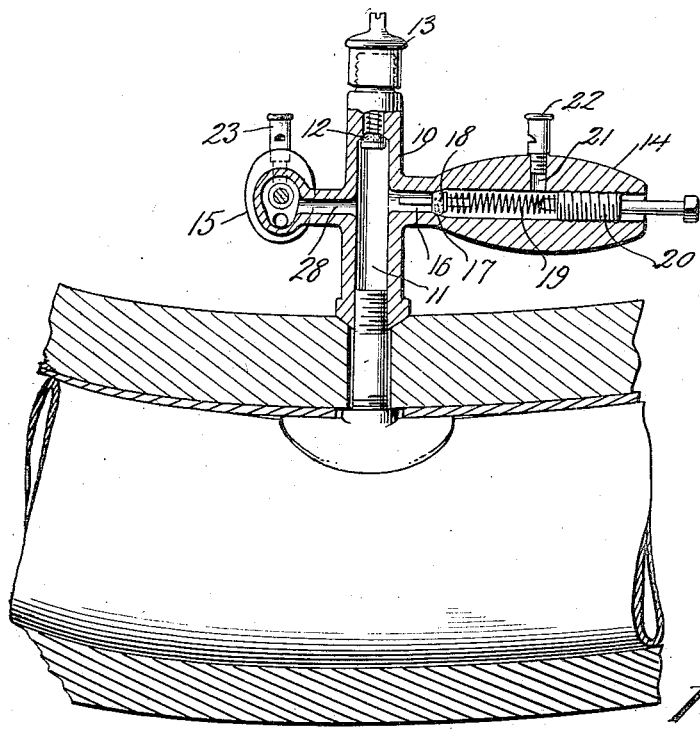
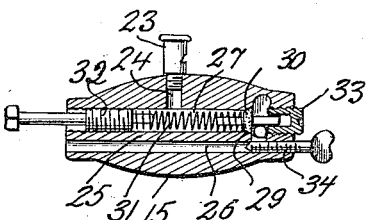
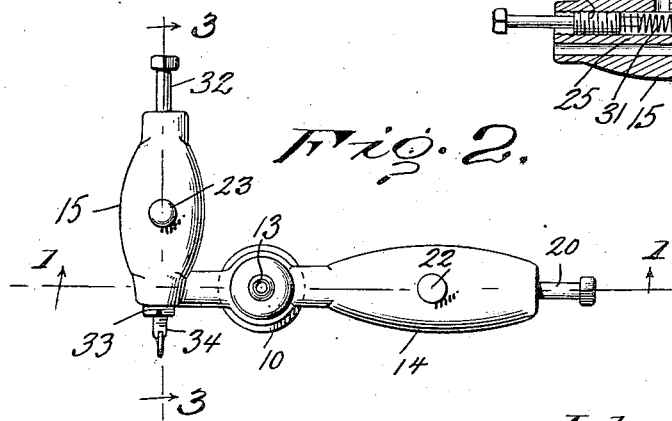
Inventor
John W. Potter.
By M...
Attorneys

UNITED STATES PATENT OFFICE.

JOHN W. POTTER, OF ARDMORE, OKLAHOMA.

TIRE-INFLATION VALVE.

1,297,239.

Specification of Letters Patent.  Patented Mar. 11, 1919.

Application filed October 31, 1917.  Serial No. 199,503.

*To all whom it may concern:*

Be it known that I, JOHN W. POTTER, a citizen of the United States, residing at Ardmore, in the county of Carter and State of Oklahoma, have invented new and useful Improvements in Tire-Inflation Valves, of which the following is a specification.

This invention relates to valves employed for inflating pneumatic tires, and its object is to provide an improved relief valve in connection therewith which automatically allows excess pressure in the tire to escape, and also to provide an alarm which is sounded when the air pressure drops below a certain predetermined point, the device therefore serving as a check or guard against over-inflation as well as under-inflation of the tire. An alarm is also associated with the relief valve, which is sounded when said valve opens.

The object stated is attained by means of a novel combination and arrangement of parts to be hereinafter described and claimed, and in order that the same may be better understood, reference is had to the accompanying drawing forming a part of this specification.

In the drawing,

Figure 1 is a cross section of the device on the line 1—1 of Fig. 2;

Fig. 2 is a plan view of the device, and

Fig. 3 is a cross section on the line 3—3 of Fig. 2.

Referring specifically to the drawing, 10 denotes a valve body having a longitudinal passage 11 one end of which contains the usual check valve 12 to prevent the air which is discharged into the tire from returning. This end of the valve body or casing is also fitted with the usual removable cap 13. The other end of the passage is adapted to be connected to the usual valve stem on the inner tube of the tire, the wall of the passage being screw threaded for this purpose. As the passage 11 contains a check valve, the usual check valve in the valve stem is dispensed with.

Intermediate its ends the valve casing 10 has two valve chambers 14 and 15, respectively, located on opposite sides of the passage 11 and being in open communication therewith.

The chamber 14 opens into the passage 11 by the way of a short passageway 16 in which latter is formed a seat 17 for a valve 18 which is held seated by a spring 19 the tension of which may be regulated by a screw 20 threaded through the wall of the chamber and bearing against the outer end of the spring, the inner end of the latter bearing against the valve.

The wall of the chamber 14 has an outlet port 21 to which is connected an audible signal device or alarm in the form of a whistle 22 which is sounded when there is an escape of air through the port 21.

The valve 18 is held closed by the spring 19 against the air pressure in the inner tube of the tire, said pressure being present in the passage 11 as the latter is connected to the valve stem of the tire tube. When the pressure in the inner tube exceeds the pressure exerted by the spring 19 against the valve 18, said valve opens, and the excess pressure escapes through the port 21 and the whistle 22, sounding the latter and giving notice that the excess pressure is being relieved. It will therefore be impossible to accidentally over-inflate the tire. Any excess pressure developing in the tire from heat or other causes, is also automatically relieved. As soon as the normal pressure is restored, the valve 18 closes. The pressure to which the valve 18 is to respond is readily regulated by adjustment of the spring 19, the screw 20 being provided for this purpose.

The valve is also provided with a low pressure alarm comprising a whistle 23 connected to a port 24 in the wall of the chamber 15. This chamber is divided by a partition 25 into two sections 26 and 27, respectively, the first mentioned section being in connection with a passageway 28 leading from the passage 11. The port 24 opens into the section 27. The partition 25 has a ported seat 29 for a valve 30 which is held to its seat by the pressure in the passage 11. This pressure is opposed by a spring 31 bearing against the valve, the tension of said spring being adjustable by a screw 32 threaded through the wall of the chamber section 27.

It will be evident that when the pressure in the tire drops to a point where it can no longer hold the valve 30 seated against the tension of the spring 31, the valve opens, allowing air to escape to the whistle 23 and sound the same. The operator is therefore notified that the tire needs pumping up, and when the normal pressure is again attained, the valve 30 closes.

Opposite the valve 30, the wall of the chamber 15 is fitted with a screw plug 33 to permit the removal of the valve.

In order that the valve 30 may be rendered inoperative while the tire is being pumped up, the chamber 15 is provided with a valve 34, which latter when it is advanced across the chamber forms a barrier across the same and thus cuts off the valve 30 from the air which is being pumped into the tire. Without this valve, the air would continually escape while the tire was being pumped up. After the tire is properly inflated, the valve 34 will be opened, and the valve 30 will now be held closed by the air pressure until the latter drops below the pressure exerted by the spring 31 against said valve, whereupon it opens, with the result that the whistle 23 is sounded.

By the use of the valve mechanism hereinbefore described, the tire can be kept properly inflated at all times, and the device effectually serves as a check or guard against over-inflation as well as under-inflation.

I claim:—

A tire inflation valve, comprising a body provided with a longitudinal passage having an air inlet at one end and an air outlet at the other end for connection with the tire, a valve chamber extending laterally from the body intermediate its ends and having an air outlet, and also provided with a passageway opening into the aforesaid passage, a partition in the valve chamber dividing the same into two sections one of which communicates with the longitudinal passage through the aforesaid passageway, and the air escape port of said chamber leading from the other section thereof, a valve in said last mentioned section, a spring engageable with said valve for opening the same, and a valve in the second-mentioned chamber adapted to cut off the last-mentioned valve from the pressure in the chamber.

In testimony whereof I affix my signature.

JOHN W. POTTER.